United States Patent
Ogawa

(10) Patent No.: US 10,116,241 B2
(45) Date of Patent: Oct. 30, 2018

(54) MOTOR CONTROL DEVICE AND MOTOR CONTROL METHOD

(71) Applicant: Mitsubishi Electric Corporation, Tokyo (JP)

(72) Inventor: Yasufumi Ogawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 225 days.

(21) Appl. No.: 14/917,824

(22) PCT Filed: Oct. 23, 2013

(86) PCT No.: PCT/JP2013/078687
§ 371 (c)(1),
(2) Date: Mar. 9, 2016

(87) PCT Pub. No.: WO2015/059784
PCT Pub. Date: Apr. 30, 2015

(65) Prior Publication Data
US 2016/0226409 A1 Aug. 4, 2016

(51) Int. Cl.
*H02P 6/10* (2006.01)
*H02P 7/08* (2006.01)
(Continued)

(52) U.S. Cl.
CPC .......... *H02P 6/10* (2013.01); *B60L 11/1803* (2013.01); *B60L 15/2063* (2013.01);
(Continued)

(58) Field of Classification Search
CPC .................. B60W 2520/10; B60W 30/143
See application file for complete search history.

(56) References Cited

U.S. PATENT DOCUMENTS

2005/0065690 A1   3/2005   Ashizawa et al.
2010/0277149 A1  11/2010   Furutani et al.
(Continued)

FOREIGN PATENT DOCUMENTS

JP   08-156607 A   6/1996
JP   09-009637 A   1/1997
(Continued)

OTHER PUBLICATIONS

International Search Report of PCT/JP2013/078687 dated Dec. 3, 2013.

*Primary Examiner* — Bickey Dhakal
*Assistant Examiner* — Charles S Laughlin
(74) *Attorney, Agent, or Firm* — Sughrue Mion, PLLC; Richard C. Turner

(57) ABSTRACT

A second upper-lower limit clipping unit performs an upper-lower limit clipping with an upper limit torque greater than that of a first upper-lower limit clipping unit, with respect to a value obtained by executing torque ripple correction by subtracting a torque ripple correction amount calculated by a torque ripple correction amount calculation unit, from a torque command subjected to the upper-lower limit clipping by the first upper-lower limit clipping unit. A carrier frequency correction amount calculation unit calculates a carrier frequency correction amount for correcting a carrier frequency of a power converter for driving the motor, in order to reduce losses in the power converter which have been increased by the execution of the torque ripple correction.

9 Claims, 7 Drawing Sheets

(51) Int. Cl.
*B60L 15/08* (2006.01)
*H02P 27/08* (2006.01)
*B60L 11/18* (2006.01)
*B60L 15/20* (2006.01)

(52) U.S. Cl.
CPC .......... H02P 27/085 (2013.01); *Y02T 10/644* (2013.01); *Y02T 10/645* (2013.01); *Y02T 10/72* (2013.01); *Y02T 10/7275* (2013.01)

(56) References Cited

U.S. PATENT DOCUMENTS

| | | | |
|---|---|---|---|
| 2015/0229250 A1* | 8/2015 | Fukunaga | H02P 6/10 |
| | | | 318/400.23 |
| 2016/0109328 A1* | 4/2016 | Kanke | G01M 15/044 |
| | | | 73/865.6 |

FOREIGN PATENT DOCUMENTS

| | | |
|---|---|---|
| JP | 2001-119981 A | 4/2001 |
| JP | 3242223 B2 | 12/2001 |
| JP | 2002-010668 A | 1/2002 |
| JP | 2005-102492 A | 4/2005 |
| JP | 2005-237172 A | 9/2005 |
| JP | 2009-106069 A | 5/2009 |
| JP | 2013-188073 A | 9/2013 |
| WO | 2009/090755 A1 | 7/2009 |

* cited by examiner

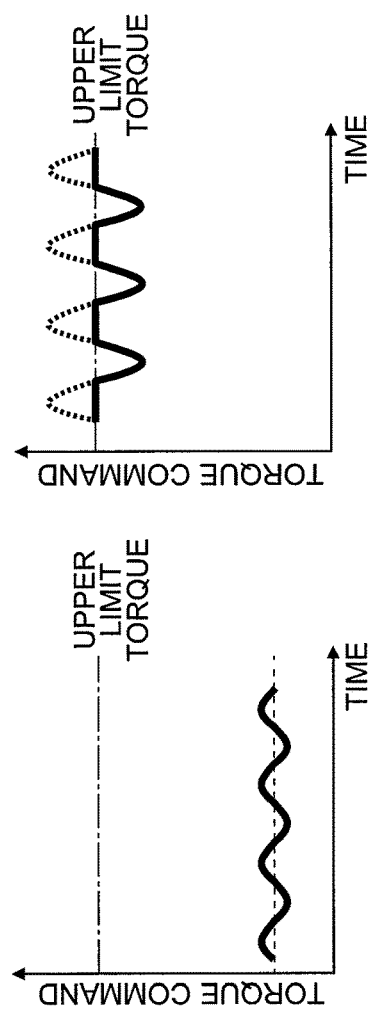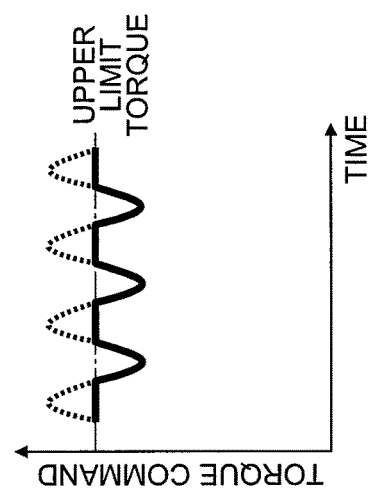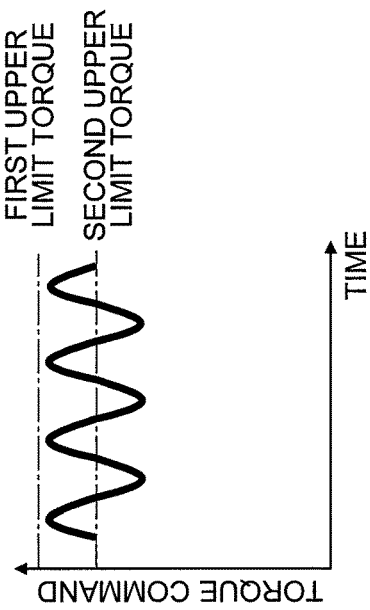

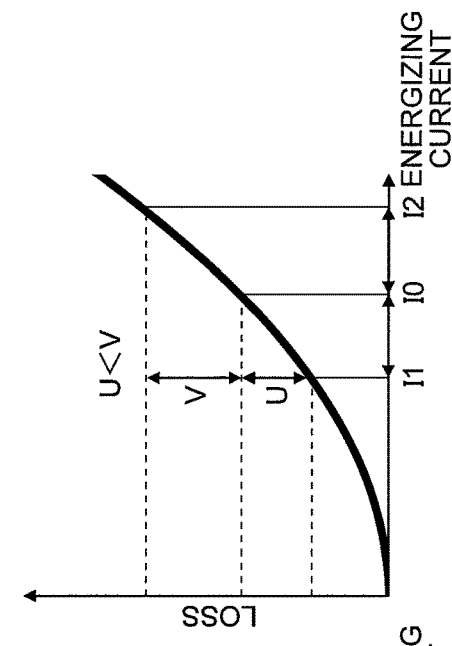
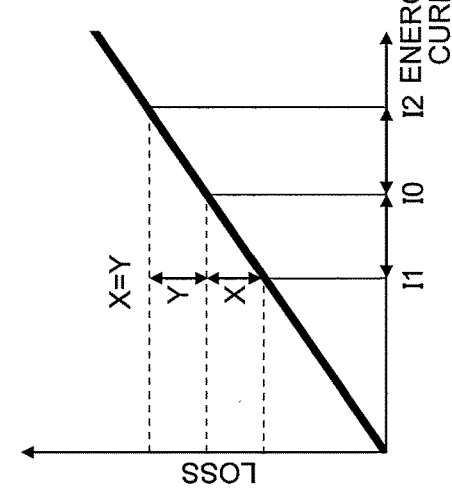
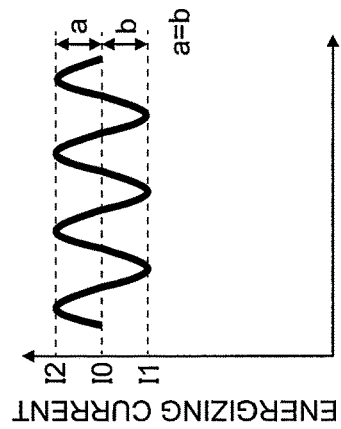

MOTOR CONTROL DEVICE AND MOTOR CONTROL METHOD

CROSS REFERENCE TO RELATED APPLICATIONS

This is a National Stage of International Application No. PCT/JP2013/078687 filed Oct. 23, 2013, the contents of which are incorporated herein by reference in its entirety.

TECHNICAL FIELD

This invention relates to a motor control device and a motor control method for controlling a motor, for example, for driving an electric vehicle or the like.

BACKGROUND ART

In a motor control device for an electric vehicle, the motor current has been conventionally controlled such that the torque generated by the motor follows a torque command corresponding to the accelerator operation performed by a driver.

In such a motor control device for an electric vehicle, it is necessary to suppress vibrations occurring when torque ripples generated in the motor in a creep travel mode of the vehicle match the resonance frequency of the torsional vibrations of the motor, and vibrations occurring due an abrupt rise in a motor torque, and to provide a comfortable ride to the driver.

Accordingly a control device for a motor has been suggested in which, in order to suppress the torque ripples of the motor and reduce vibrations, a map relating to the amplitude and phase of the torque ripples generated in the motor is created in advance, and a ripple compensation value corresponding to a torque command is calculated with reference to the map such that the amplitude and phase of the torque ripples are suppressed, thereby suppressing the motor shaft vibrations produced by the torque ripples (see, for example, PTL 1).

CITATION LIST

Patent Literature

[PTL 1]
Japanese Patent No. 3242223
[PTL 2]
Japanese Patent Application Publication No. H 9-9637

SUMMARY OF INVENTION

Technical Problem

However, the following problems are associated with the related air.

In the conventional control device for a motor described in PTL 1, a large torque is required for the motor, for example, when a vehicle travels uphill a road with a large gradient. In this case, part of the torque corrected such as to suppress the torque ripples rests on an upper limit torque, and the resultant problem is that vibrations cannot be reduced.

The present invention has been created to resolve the above-mentioned problems, and it is an objective thereof to provide a motor control device and a motor control method with which vibrations generated in a vehicle can be suppressed without increasing the losses.

Solution to Problem

A motor control device in accordance with the present invention is a motor control device for a vehicle which is provided with a motor as a power source, the motor control device including: a first upper-lower limit clipping unit that performs upper-lower limit clipping with respect to a torque command received from a vehicle controller controlling a torque generated by the motor; a torque ripple correction amount calculation unit that calculates, on the basis of the torque command and a motor revolution speed of the motor, a torque ripple correction amount for suppressing torque ripples generated in the motor; a second upper-lower limit clipping unit that performs upper-lower limit clipping with an upper limit torque greater than that of the first upper-lower limit clipping unit, with respect to a value obtained by executing torque ripple correction by subtracting the torque ripple correction amount from the torque command subjected to the upper-lower limit clipping by the first upper-lower limit clipping unit; and a carrier frequency correction amount calculation unit that calculates a carrier frequency correction amount for correcting a carrier frequency of a power converter for driving the motor, in order to reduce losses in the power converter which have been increased by the execution of the torque ripple correction.

A motor control method in accordance with the present invention is a motor control method realized by a motor control device for a vehicle which is provided with a motor as a power source, the motor control method including: a first upper-lower limit clipping step for performing upper-lower limit clipping with respect to a torque command relating to a torque generated by the motor; a torque ripple correction amount calculation step for calculating, on the basis of the torque command and a motor revolution speed of the motor, a torque ripple correction amount for suppressing torque ripples generated in the motor; a second upper-lower limit clipping step for performing upper-lower limit clipping with an upper limit torque greater than that in the first upper-lower limit clipping step with respect to a value obtained by executing torque ripple correction by subtracting the torque ripple correction amount from the torque command subjected to the upper-lower limit clipping in the first upper-lower limit clipping step; and a carrier frequency correction amount calculation step for calculating a carrier frequency correction amount for correcting a carrier frequency of a power converter for driving the motor, in order to reduce losses in the power converter which have been increased by the execution of the torque ripple correction.

Advantageous Effects of Invention

With the motor control device and motor control method in accordance with the present invention, the second upper-lower limit clipping unit performs upper-lower limit clipping with an upper limit torque greater than that of the first upper-lower limit clipping unit, with respect to a value obtained by executing torque ripple correction by subtracting the torque ripple correction amount calculated in a torque ripple correction amount calculation unit from the torque command subjected to the upper-lower limit clipping by the first upper-lower limit clipping unit, and the carrier frequency correction amount calculation unit calculates a carrier frequency correction amount for correcting a carrier frequency of a power converter for driving the motor, in order to reduce losses in the power converter which have been increased by the execution of the torque ripple correction.

Therefore, it is possible to obtain a motor control device and a motor control method with which vibrations generated in a vehicle can be suppressed without increasing the losses.

BRIEF DESCRIPTION OF DRAWINGS

FIGS. 4A, 4B, 4C are explanatory drawings illustrating, in comparison with the conventional example, the relationship between the torque ripple correction and upper-lower limit clips in the motor control device according to Embodiment 1 of the invention.

FIGS. 5A, 5B, 5C are explanatory drawings illustrating the relationship between the torque ripple correction and losses in the motor control device according to Embodiment 1 of the invention.

DESCRIPTION OF EMBODIMENTS

Figure 1:
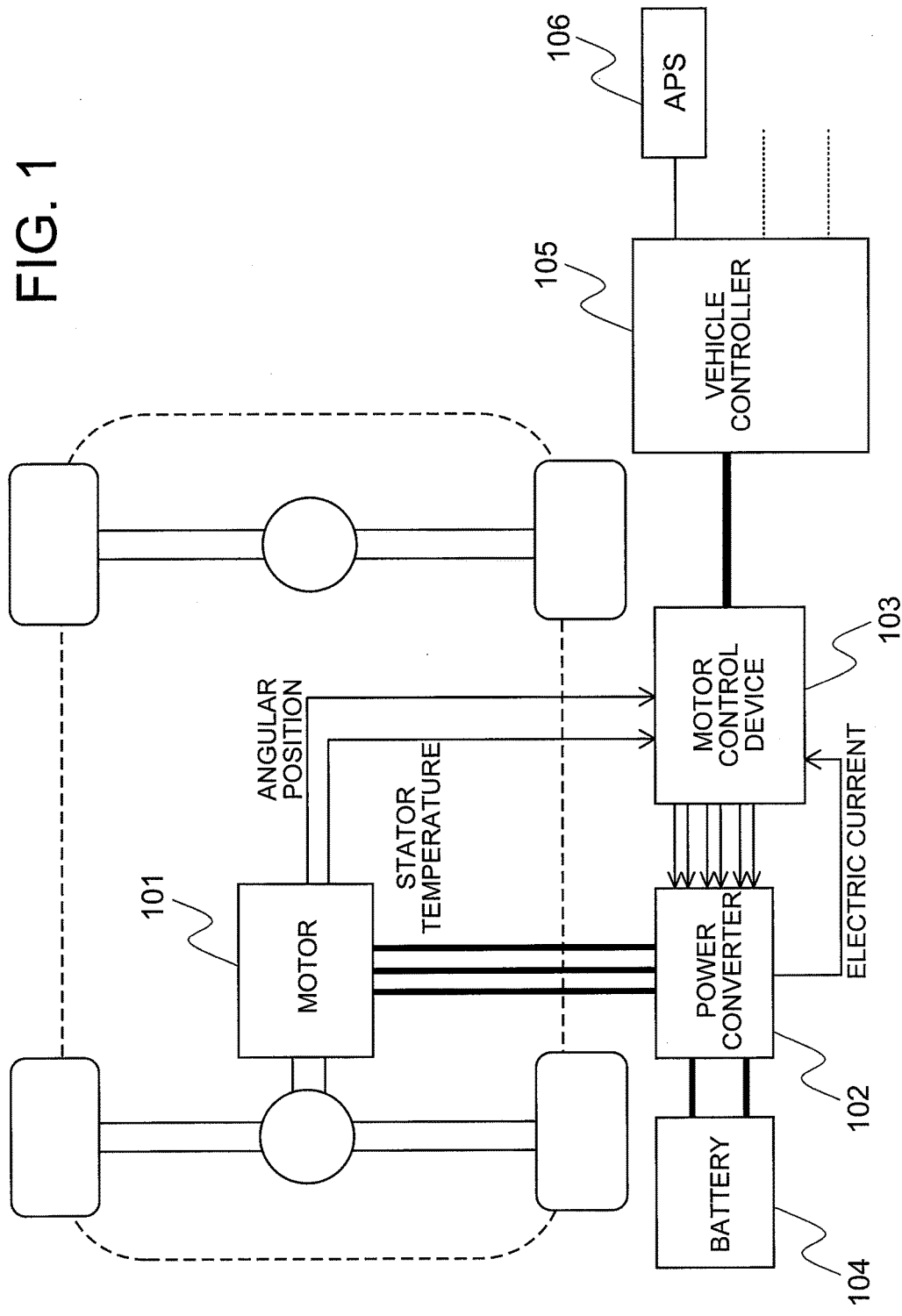
FIG. 1 is a block configuration diagram illustrating an electric vehicle using the motor control device according to Embodiment 1 of the invention.

The preferred embodiments of the motor control method and motor control device according to the invention will be described hereinbelow with reference to the drawings. In the drawings, like or corresponding parts are denoted by like reference numerals.

Embodiment 1

FIG. 1 is a block configuration diagram illustrating an electric vehicle using the motor control device according to Embodiment 1 of the invention. In FIG. 1, the electric vehicle is provided with a motor 101, a power converter 102, a motor controller 103, a battery 104, a vehicle controller 105, and an accelerator position sensor (APS) 106.

The motor 101 is connected to a final gear (not depicted in the figure) of the vehicle and drives the vehicle by transferring power to a shaft. The power converter 102 is an inverter that supplies AC power for driving the motor 101 to the motor 101. The power converter 102 is configured of six switching elements or capacitors. For example, an insulated gate bipolar transistor (IGBT) can be used for the switching element.

The motor controller 103 controls the power converter 102 such that a torque corresponding to the torque command output from the vehicle controller 105 is generated in the motor 101. In this case, for example, a CAN (Controller Area Network) is used to exchange information between the motor controller 103 and the vehicle controller 105.

More specifically, the motor controller 103 outputs an ON/OFF signal that ON/OFF controls the switching elements of the power converter 102 on the basis of the outputs signals from an angular position sensor that is mounted on the motor 101 and detects the angular position of a rotor, a temperature sensor that is mounted on the motor 101 and detects the temperature (stator temperature) of a stator coil, and a current sensor that is provided at the power converter 102 and detects the electric current flowing in the power converter 102.

The battery 104 supplies DC power to the power converter 102. For example, a lithium ion battery can be used as the battery 104. The vehicle controller 105 determines the torque, which is to be generated in the motor 101, on the basis of a driver operation amount from the accelerator position sensor 106 and the state (for example, speed) of the vehicle obtained from another sensor (not depicted in the figure). The accelerator position sensor 106 detects the accelerator depression amount created by the driver and outputs the detected amount to the vehicle controller 105.

Figure 2:
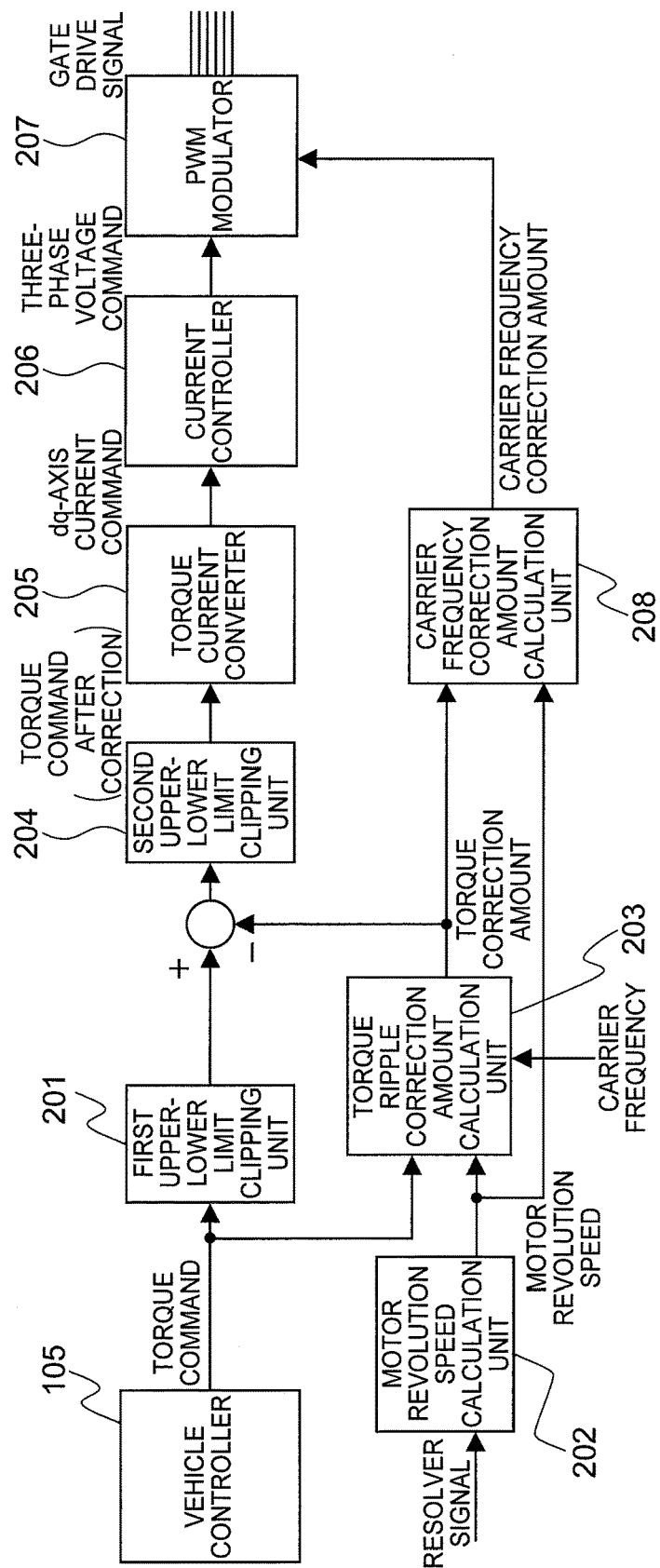
FIG. 2 is a block configuration diagram illustrating in detail the motor control device depicted in FIG. 1.

FIG. 2 is a block configuration diagram illustrating in detail the motor controller 103 depicted in FIG. 1. In FIG. 2, the motor controller 103 has a first upper-lower limit clipping unit 201, a motor revolution speed calculation unit 202, a torque ripple correction amount calculation unit 203, a second upper-lower limit clipping unit 204, a torque current converter 205, a current controller 206, a PWM modulator 207, and a carrier frequency correction amount calculation unit 208.

The first upper-lower limit clipping unit 201 performs the upper-lower limit clipping with respect to the torque command received from the vehicle controller 105. The motor revolution speed calculation unit 202 calculates the motor revolution speed on the basis of the resolver signal obtained from the angular position sensor of the motor 101. More specifically, the motor revolution speed calculation unit 202 calculates the motor revolution angle from the resolver signal and then calculates the revolution speed by taking the derivative of the calculated motor revolution angle.

The torque ripple correction amount calculation unit 203 calculates the torque ripple correction amount from the torque command received from the vehicle controller 105, the motor revolution speed calculated by the motor revolution speed calculation unit 202, and the below-described carrier frequency. The carrier frequency is the last value of the carrier frequency corrected by the PWM modulator 207.

As for the torque ripple correction amount in this case, the torque ripples are actually measured in advance with the motor alone and the results are mapped. The torque ripple correction amount calculation unit 203 stores the map in a ROM, and in the case of actual use, calculates the torque ripple correction amount from the torque command and motor revolution speed by referring to the map.

The second upper-lower limit clipping unit 204 performs the upper-lower limit clipping with respect to the value obtained by subtracting the torque ripple correction amount calculated in the torque ripple correction amount calculation unit 203 from the torque command that has been clipped in the first upper-lower limit clipping unit 201. In this case, the upper limit torque of the second upper-lower limit clipping unit 204 is set to a value greater than the upper limit torque of the first upper-lower limit clipping unit 201.

The torque current converter 205 calculates a d-axis current command and a q-axis current command from the torque command which has been clipped in the second upper-lower limit clipping unit 204. In this case, information such as the motor revolution speed and DC voltage may be used when converting from the torque to the current (such a configuration is not depicted in the figures).

The current controller 206 performs feedback control such that the d-axis current and q-axis current follow the d-current command and q-current command calculated by the torque current converter 205 and calculates a three-phase voltage command.

In this case, the d-axis current and q-axis current are calculated by dq conversion of the AC current measured with the current sensor mounted on the power converter 102, this conversion using the motor revolution angle. Further, the three-phase voltage command is calculated using the d-axis voltage command and q-axis voltage command obtained by the feedback control and also the motor revolution angle.

The PWM modulator 207 calculates a gate drive signal from the three-phase voltage command calculated by the current controller 206. In this case, the gate drive signal is calculated by comparing the three-phase voltage command with a triangular wave carrier.

The carrier frequency corrected by the carrier frequency correction amount calculated by the below-described carrier frequency correction amount calculation unit 208 is used as the frequency (carrier frequency) of the triangular wave carrier. The correction of the carrier frequency is performed, for example, by subtracting the carrier frequency correction amount from the carrier frequency taken as a base.

The carrier frequency correction amount calculation unit 208 calculates the carrier frequency correction amount from the torque ripple correction amount calculated by the torque ripple correction amount calculation unit 203 and the motor revolution speed calculated by the motor revolution speed calculation unit.

Figure 3:
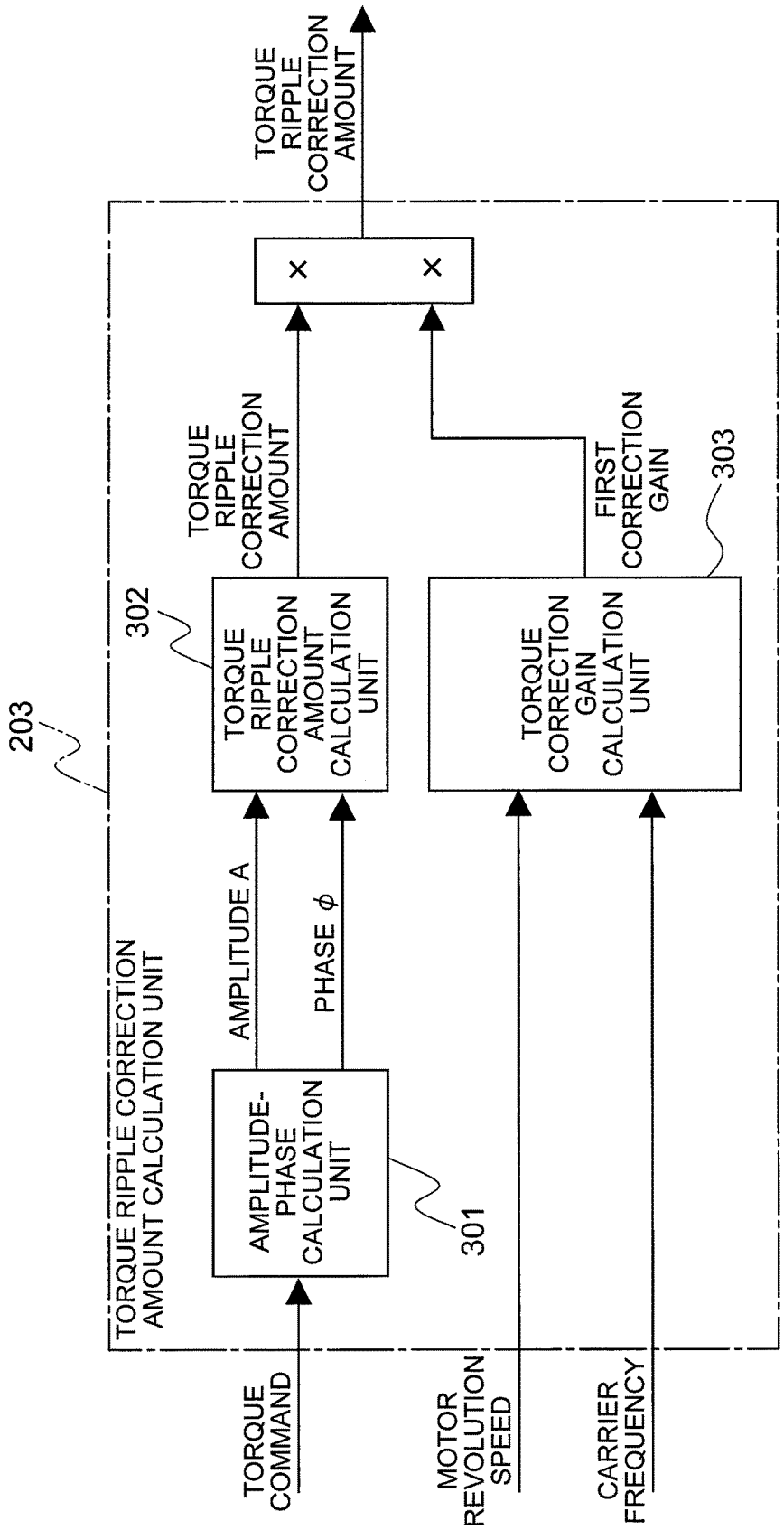
FIG. 3 is a block configuration diagram illustrating in detail the torque ripple correction amount calculation unit depicted in FIG. 2.

FIG. 3 is a block configuration diagram illustrating in detail the torque ripple correction amount calculation unit 203 depicted in FIG. 2. In FIG. 3, the torque ripple correction amount calculation unit 203 has an amplitude-phase calculation unit 301, a torque ripple correction amount calculation unit 302, and a torque correction gain calculation unit 303.

The amplitude-phase calculation unit 301 calculates the amplitude A and phase $\phi$ of the torque ripple correction amount from the torque command. It is generally known that torque ripples are generated by a frequency which is 6 or 12 times (represented hereinbelow as "6f" and "12f") the fundamental frequency. Accordingly, the amplitude-phase calculation unit 301 actually measures the torque ripples in advance for each torque command, extracts the amplitude and phase of 6f- and 12f-component torque ripples from the measurement results, and maps the extracted amplitude and phase.

The maps are created separately for 6f and 12f, and the amplitude A and phase $\phi$ are calculated for each 6f and 12f component at the time of actual use. Thus, the amplitude-phase calculation unit 301 calculates the amplitude A and phase $\phi$ of the 6f component and the amplitude A and phase $\phi$ of the 12f component. The fundamental frequency is the frequency of the AC current for driving the motor 101 and can be calculated by the following expression.

(Fundamental frequency [Hz]=(motor revolution speed [r/min])/60×(number of pole pairs in the motor)

The torque ripple correction amount calculation unit 302 calculates the torque ripple correction amount from the amplitude A and phase $\phi$ calculated by the amplitude-phase calculation unit 301. For example, where the torque ripple correction amount of the 6f component is denoted by X6, the amplitude is denoted by A6, and the phase is denoted by $\phi6$, the torque ripple correction amount is calculated by X6 =A6 sin(6ωt+$\phi6$). Likewise, where the torque ripple correction amount of the 12f component is denoted by X12, the amplitude is denoted by A12, and the phase is denoted by $\phi12$, the torque ripple correction amount is calculated by X12=A12 sin(12ωt+$\phi12$).

Here, ω is the fundamental frequency [rad/s]. In Embodiment 1, 6f and 12f are used for the correction amounts, but higher harmonics (for example, an 18-fold harmonic) may be also used. The torque ripple correction amount X is eventually calculated as X=X6 +X12 from those results.

The torque correction gain calculation unit 303 calculates a first correction gain G1 from the motor revolution speed and carrier frequency. In the system configuration of Embodiment 1, vibrations generated under the effect of torque ripples are only in a low-revolution region, and in a high-revolution region (predetermined revolution speed), the torque ripple correction amount can be made 0. For this reason, the torque correction gain calculation unit 303, for example, holds a map of the correction gain corresponding to the motor revolution speed and determines the first correction gain G1 from the map.

Further, the first correction gain G1 is a value of 0≤G1≤1, and when the torque ripples of the motor 101 are to be entirely removed, the first correction gain is set to 1.

Finally, the torque ripple correction amount calculation unit 203 multiplies the torque ripple correction amount X calculated by the torque ripple correction amount calculation unit 302 by the first correction gain G1 calculated by the torque correction gain calculation unit 303 and outputs the product as the torque ripple correction amount.

The relationship between the torque ripple correction and upper-lower limit clips will be explained hereinbelow with reference to FIG. 4A 4B and 4C. FIGS. 4A, 4B, 4C are explanatory drawings illustrating, in comparison with the conventional example, the relationship between the torque ripple correction and upper-lower limit clips in the motor control device according to Embodiment 1 of the invention.

FIG. 4A depicts time-series data of the torque command in the case of creep running on a flat road. In the case of creep running on a flat road, the torque command becomes less than the upper limit torque. Therefore, even when the torque ripple correction is performed, the upper limit torque is not reached and vibrations are not generated.

FIG. 4B depicts time-series data of the torque command at the time of traveling uphill on a steep road with respect to the conventional motor control device. When the vehicle travels uphill on a steep road, a large torque is needed and therefore the torque command subjected to torque ripple correction partially exceeds the upper limit torque, sufficient effect of torque ripple correction is not obtained, and vibrations are generated.

FIG. 4C depicts time-series data of the torque command at the time of traveling uphill on a steep road with respect to the motor control device of Embodiment 1 of the invention. In this case, since the upper limit torque of the second upper-lower limit clipping unit 204 is set to a value greater than the upper limit torque of the first upper-lower limit clipping unit 201, the torque command does not rest on the upper limit torque and vibrations are not generated.

Further, in the torque ripple correction in Embodiment 1 of the invention, a sine wave torque ripple correction amount is subtracted from the torque command received by the vehicle controller 105. Therefore, when there is a portion in which the torque command after the correction increases with respect to the torque command, there is also a portion in which the torque command after the correction decreases with respect to the torque command, and the average torque is constant.

Losses occurring when the torque ripple correction is performed will be explained hereinbelow with reference to FIGS. 5A, 5B, and 5C. FIGS. 5A, 5B, 5C are explanatory drawings illustrating the relationship between the torque ripple correction and losses in the motor control device according to Embodiment 1 of the invention.

FIG. 5A illustrates the energizing current in the case in which the torque ripple correction is performed. In a motor, the torque and energizing current are proportional to each other. Therefore, when the torque ripple correction is performed with a torque of a sine wave, a sine energizing current waveform is obtained. Further, in FIG. 5A, I1=I0−b, I2=I0+a, where a=b.

FIG. 5B illustrates the energizing current and losses with respect to losses proportional to the first power of energizing current. In an inverter, switching losses generally correspond to such losses.

Thus, with respect to the losses proportional to the first power of energizing current, when an energizing current flows on which a sine wave has been superimposed as depicted in FIG. 5A, the losses increase in portions greater than the energizing current I0 and the losses decrease in portions less than the energizing current I0.

The loss decrease amount X in the case of the energizing current I1 and the loss increase amount Y in the case of the energizing current I2 are equal to each other, and even though the sine wave has been superimposed, on average, the losses do not increase.

FIG. 5C depicts the energizing current and losses with respect to losses proportional to the second power of energizing current. Stationary losses (losses caused by a collector-emitter voltage) of an IGBT generally correspond to such losses.

Thus, with respect to the losses proportional to the second power of energizing current, when an energizing current flows on which a sine wave has been superimposed as depicted in FIG. 5A, the losses increase in portions greater than the energizing current I0 and the losses decrease in portions less than the energizing current I0.

Further, of a loss decrease amount U in the case in which the energizing current is I1 and the loss increase amount V in the case in which the energizing current is I2, the loss increase amount V is greater. Thus, on average, the losses increase.

As indicated hereinabove, as a result of performing the torque ripple correction, on average, the losses proportional to the second power of energizing current increase. Accordingly, described hereinbelow is a method for reducing the losses increased by the torque ripple correction.

Figure 6:
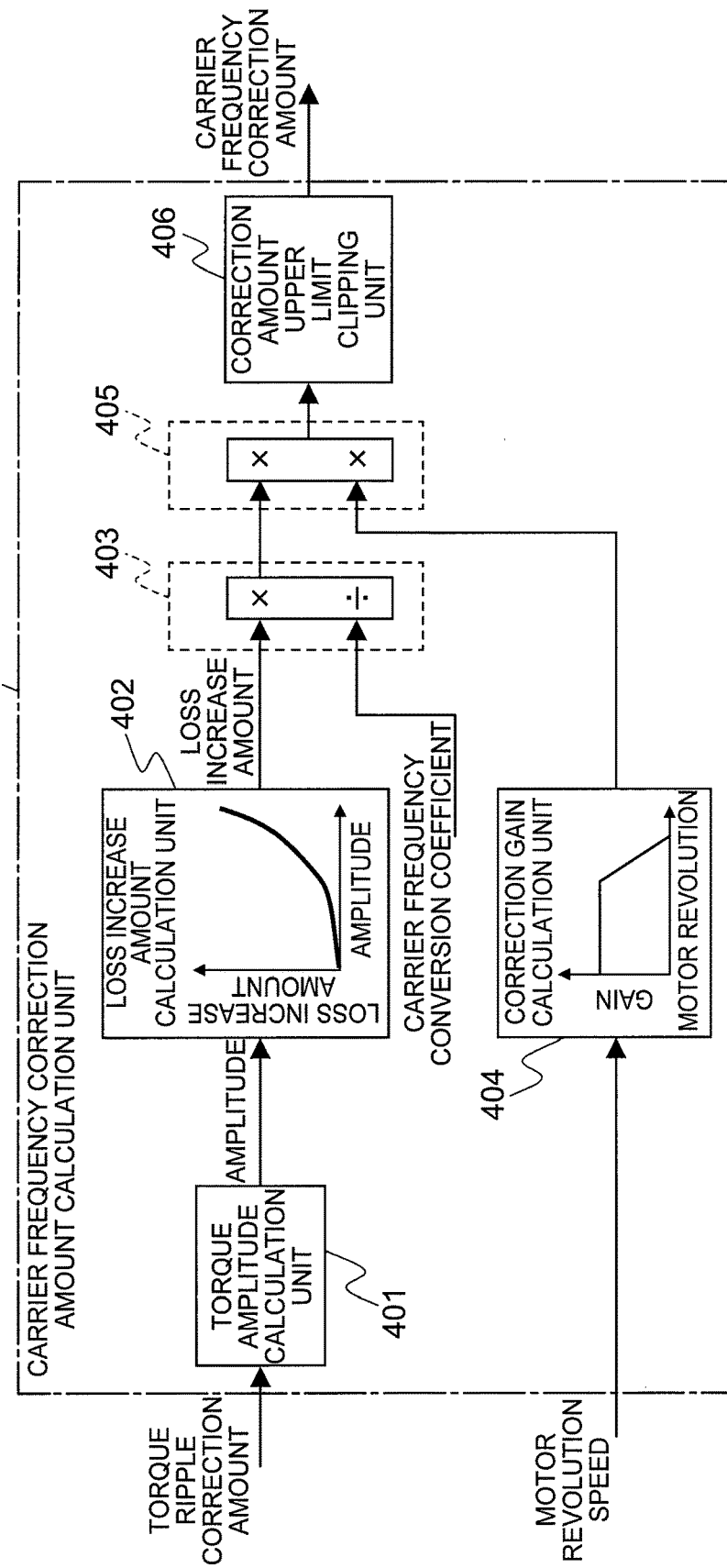
FIG. 6 is a block configuration diagram illustrating in detail the carrier frequency correction amount calculation unit depicted in FIG. 2.

FIG. 6 is a block configuration diagram illustrating in detail the carrier frequency correction amount calculation unit 208 depicted in FIG. 2. In FIG. 6, the carrier frequency correction amount calculation unit 208 has a torque amplitude calculation unit 401, a loss increase amount calculation unit 402, a frequency correction amount calculation unit 403, a correction gain calculation unit 404, a correction gain processing unit 405, and a correction amount upper limit clipping unit 406.

The torque amplitude calculation unit 401 calculates the amplitude of the torque ripple correction amount from the torque ripple correction amount calculated by the torque ripple correction amount calculation unit 203. In FIG. 4, the amplitude is calculated from the torque ripple correction amount, but the amplitude calculated by the amplitude-phase calculation unit 301 may be also used as is. In this case, the amplitude is calculated for each frequency such as 6f and 12f.

The loss increase amount calculation unit 402 calculates a loss increase amount from the amplitude calculated by the torque amplitude calculation unit 401. In this case, a map is created from the results obtained in advance by actual measurements, and the loss increase amount is determined from the amplitude.

The frequency correction amount calculation unit 403 calculates the carrier frequency correction amount on the basis of the loss increase amount calculated by the loss increase amount calculation unit 402 and a carrier frequency conversion coefficient which has been determined in advance. The carrier frequency conversion coefficient is determined in advance from the relationship between the carrier frequency and switching losses.

Figure 7:
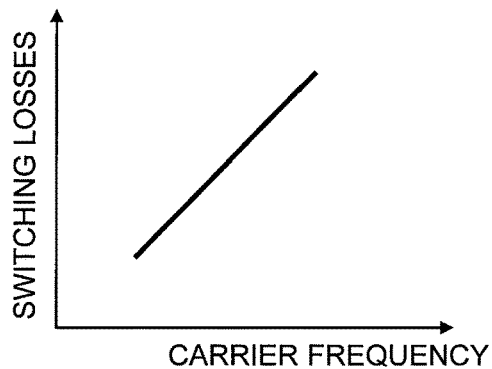
FIG. 7 is an explanatory drawing illustrating the relationship between the carrier frequency and switching losses with respect to the carrier frequency conversion coefficient depicted in FIG. 6.

FIG. 7 is an explanatory drawing illustrating the relationship between the carrier frequency and switching losses with respect to the carrier frequency conversion coefficient depicted in FIG. 6. The switching losses herein relate to the case in which the carrier frequency is changed on the basis of a certain energizing current.

In FIG. 7, where the carrier frequency is raised, the number of switching cycles of the switching elements constituting the power converter 102 increases. Therefore, switching losses increase with the carrier frequency. In this case, where the carrier frequency is denoted by fc, the switching loses Wsw can be represented by the following expression.

$$Wsw = P \times fc.$$

Thus, in order to reduce the switching losses ΔW when the switching losses are reduced by decreasing the carrier frequency, it is necessary to decrease the carrier frequency ΔW/P. The proportional coefficient P is used as the carrier frequency conversion coefficient.

Returning to FIG. 6, the correction gain calculation unit 404 calculates a second correction gain G2 for carrier frequency correction from the motor revolution speed calculated by the motor revolution speed calculation unit 202. Thus, when the motor revolution speed becomes a high revolution speed (predetermined revolution speed), the torque ripple correction is not needed. Therefore, in this case, the second correction gain G2 is set such as to also set the carrier frequency correction amount to 0. Therefore, the second correction gain G2 is a value of 0≤G2≤1, and when the carrier frequency correction is not performed, the second correction gain is set to 0.

Thus, when the motor revolution speed is high, the carrier frequency is not reduced at the time of a high revolution speed by setting the carrier frequency correction amount to 0. Therefore, unnecessary noise is not increased and the driver is not made uncomfortable. Where an element temperature is measured using a temperature sensor, or the like, and the element temperature is low, it is possible to assume that the amount of heat generation is small and losses are small. Thus, the second correction gain may be set to 0 and the carrier frequency may not be corrected.

The correction gain processing unit 405 calculates the final carrier frequency correction amount by multiplying the carrier frequency correction amount calculated by the frequency correction amount calculation unit 403 by the second correction gain G2 calculated by the correction gain calculation unit 404.

The correction amount upper limit clipping unit 406 performs upper-limit clipping with respect to the final carrier frequency correction amount calculated by the correction gain processing unit 405. In this case, even when the carrier frequency is reduced, the upper limit clip value of the correction amount upper limit clipping unit 406 is determined from the results obtained in estimating in advance a level at which the effect of noise is small.

A temperature protection circuit for a power converter is known which is configured to enable a two-stage change of carrier frequency for driving the switching elements constituting an inverter and which changes the carrier frequency to a low value when the current output by the power converter decreases below a predetermined value (see, for example, PTL 2).

However, with the temperature protection circuit of the power converter disclosed in PTL 2, since the carrier frequency is changed discretely in two stages, the carrier frequency is unnecessarily decreased. The resultant problem is that noise generated by the carrier frequency becomes audible and the driver is made uncomfortable.

By contrast, in Embodiment 1, the carrier frequency is continuously corrected on the basis of the torque ripple correction amount and motor revolution speed, and the upper limit clipping is performed with respect to the final carrier frequency correction amount. Therefore, the unnecessary noise is not increased.

In this case, the upper limit clipping is performed with respect to the final carrier frequency correction amount in the correction amount upper limit clipping unit 406, but when the final carrier frequency correction amount hangs on the upper limit clipping (has reached the upper limit), that is, when the carrier frequency has reached the lower limit value, the amplitude of the torque ripple correction amount may be reduced and the torque ripple correction may be performed to the extent possible.

Figure 8:
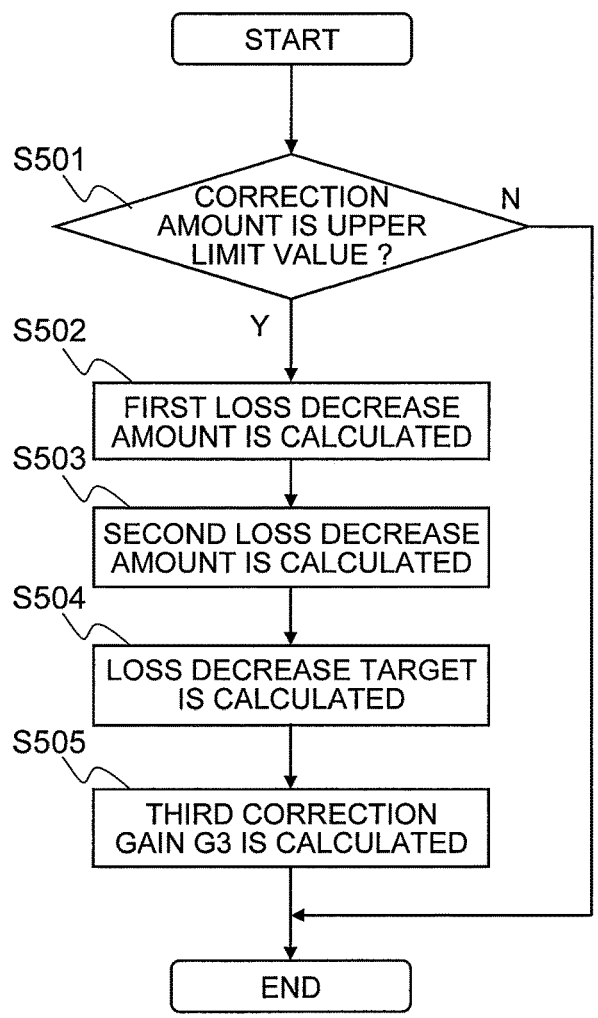
FIG. 8 is a flowchart illustrating the processing performed when the carrier frequency correction amount has reached the upper limit value in the motor control device according to Embodiment 1 of the invention.

FIG. 8 is a flowchart illustrating the processing performed when the carrier frequency correction amount has reached the upper limit value in the motor control device according to Embodiment 1 of the invention. The flowchart detected in FIG. 8 is implemented, for example, by the correction amount upper limit clipping unit 406 with a constant period of, for example, 10 ms.

Initially it is determined whether or not the carrier frequency correction amount calculated by the carrier frequency correction amount calculation unit 208 rests on the upper limit clip in the correction amount upper limit clipping unit 406 (step S501).

Where it is determined in step S501 that the carrier frequency correction amount rests on the upper limit clip (that is, Yes), the first loss reduction amount prior to clipping in the correction amount upper limit clipping unit 406 is calculated (step S502).

In this case, since the loss increase amount calculated by the loss increase amount calculation unit 402 and the first loss decrease amount are equal to each other, the loss increase amount calculated by the loss increase amount calculation unit 402 is taken as the first loss decrease amount.

Then, the second loss decrease amount after the upper limit clipping performed with the correction amount upper limit clipping unit 406 is calculated (step S503). Since a value determined in advance is used as the upper limit clipping value in the correction amount upper limit clipping unit 406, the second loss decrease amount corresponding to this value may be prepared in advance. More specifically, the second loss decrease amount is represented by the following expression.

(Second loss decrease amount)=(carrier frequency conversion coefficient P)×(correction amount upper limiting clipping value)

Then, a target value of the losses reduced by the adjustment of the correction gain is calculated as a loss decrease target (step S504). In this case, the losses necessary to perform the torque ripple correction and suppress the vibrations are the first loss decrease amount and losses that can be decreased by correcting the carrier frequency are the second loss decrease amount. Therefore, the loss decrease target which should be reached by adjusting a third correction gain G3 is represented by the following formula.

(Loss decrease target)=(first loss decrease amount)−(second loss decrease amount)

The third correction gain G3 is then calculated from the loss decrease target calculated in step S504 (step S505), and the processing depicted in FIG. 8 is ended.

In this case, an amplitude (referred to hereinbelow as "amplitude 2") is calculated that makes it possible to reach the loss decrease target by using the map of the amplitude and loss increase amount which has been used for calculating the loss increase amount with the loss increase amount calculation unit 402. Further, the third correction gain G3 is calculated by the following expression from the amplitude calculated by the torque amplitude calculation unit 401.

(Third correction gain G3)=(amplitude 2)/(amplitude)

Meanwhile, when it is determined that the carrier frequency correction amount has not been upper-limit clipped (that is, No) in step S501, the processing depicted in FIG. 8 ends as is.

The third correction gain G3 calculated in step S505 is multiplied by the torque ripple correction amount at a stage at which the torque ripple correction amount is subtracted before the second upper-lower limit clipping unit 204 depicted in FIG. 2.

As described hereinabove, in Embodiment 1, the second upper-lower limit clipping unit performs upper-lower limit clipping with an upper limit torque greater than that of the first upper-lower limit clipping unit, with respect to a value obtained by executing torque ripple correction by subtracting the torque ripple correction amount, which has been calculated by the torque ripple correction amount calculation unit, from the torque command subjected to the upper-lower limit clipping by the first upper-lower limit clipping unit, and the carrier frequency correction amount calculation unit calculates the carrier frequency correction amount for correcting the carrier frequency of a power converter for driving the motor, in order to reduce losses in the power converter which have been increased by the execution of the torque ripple correction. Therefore, it is possible to obtain a motor control device and a motor control method with which vibrations generated in a vehicle can be suppressed without increasing the losses. Further, vibrations can be suppressed even when the torque is large as in the case of traveling uphill on a steep road or when the torque command has changed abruptly. Since the carrier frequency is not reduced more than necessary, vibrations can be suppressed without generating an unpleasant noise.

Further, when the carrier frequency correction amount is greater than a predetermined upper limit value, the carrier frequency correction amount calculation unit clips the carrier frequency correction amount with the upper limit value and also decreases the amplitude of torque ripple correction amount.

Therefore, vibrations can be suppressed to the maximum limit within a range in which no effect is produced by the noise generated by the carrier frequency.

When the motor revolution speed reaches the predetermined revolution speed, the torque ripple correction amount calculation unit stops the calculation of the torque ripple correction amount.

Therefore, the driver is not made uncomfortable.

Further, when the motor revolution speed reaches the predetermined revolution speed, the carrier frequency correction amount calculation unit stops the calculation of the carrier frequency correction amount.

Therefore, the generation of audible sounds caused by the unnecessary reduction of carrier frequency can be suppressed.

The invention claimed is:

1. A motor control device for a vehicle which is provided with a motor as a power source, the motor control device comprising:
    a first torque limiter that performs clipping of a torque value with a first upper limit torque value, with respect to a torque command received from a vehicle controller, the torque command controlling a torque generated by the motor;
    a motor revolution speed calculator that receives a resolver signal and calculates a motor revolution speed of the motor based on the resolver signal;
    a torque ripple correction amount calculator that calculates a torque ripple correction amount for suppressing torque ripples generated in the motor, based on the torque command and the motor revolution speed;
    an adder that subtracts the torque ripple correction amount from the torque value of the torque command subjected to the clipping with the first upper limit torque value;
    a second torque limiter that performs clipping on the torque value output from the adder with a second upper limit torque value greater than the first upper limit torque value;
    a carrier frequency correction amount calculator that calculates a carrier frequency correction amount for correcting a carrier frequency of a power converter for driving the motor, based on the torque ripple correction amount and the motor revolution speed, in order to reduce losses in the power converter caused by a torque ripple correction; and
    a PWM modulator that corrects the carrier frequency based on the carrier frequency correction amount, calculates a drive signal for the power converter based on the corrected carrier frequency and the torque command which has the torque value subjected to the clipping with the second upper limit torque value, and supplies the drive signal to the power converter to drive the motor.

2. The motor control device according to claim 1, wherein the carrier frequency correction amount calculator clips the carrier frequency correction amount with an upper limit value and reduces an amplitude of the torque ripple correction amount when the carrier frequency correction amount is greater than a predetermined upper limit value.

3. The motor control device according to claim 1, wherein the torque ripple correction amount calculator stops the calculation of the torque ripple correction amount when the motor revolution speed becomes a predetermined revolution speed.

4. The motor control device according to claim 2, wherein the torque ripple correction amount calculator stops the calculation of the torque ripple correction amount when the motor revolution speed becomes a predetermined revolution speed.

5. The motor control device according to claim 1, wherein the carrier frequency correction amount calculator stops the calculation of the carrier frequency correction amount when the motor revolution speed becomes a predetermined revolution speed.

6. The motor control device according to claim 2, wherein the carrier frequency correction amount calculator stops the calculation of the carrier frequency correction amount when the motor revolution speed becomes a predetermined revolution speed.

7. The motor control device according to claim 3, wherein the carrier frequency correction amount calculator stops the calculation of the carrier frequency correction amount when the motor revolution speed becomes a predetermined revolution speed.

8. The motor control device according to claim 4, wherein the carrier frequency correction amount calculator stops the calculation of the carrier frequency correction amount when the motor revolution speed becomes a predetermined revolution speed.

9. A motor control method realized by a motor control device for a vehicle which is provided with a motor as a power source, the motor control method comprising:
    performing first clipping of a torque value with a first upper limit torque value, with respect to a torque command received from a vehicle controller, the torque command controlling a torque generated by the motor;
    calculating a motor revolution speed of the motor based on a resolver signal;
    calculating a torque ripple correction amount for suppressing torque ripples generated in the motor, based on the torque command and the motor revolution speed;
    subtracting, by an adder, the torque ripple correction amount from the torque value of the torque command subjected to the first clipping;
    performing second clipping on the torque value output from the adder with a second upper limit torque value greater than the first upper limit torque value;
    calculating a carrier frequency correction amount for correcting a carrier frequency of a power converter for driving the motor, based on the torque ripple correction amount and the motor revolution speed; and
    correcting the carrier frequency based on the carrier frequency correction amount;
    calculating, by a PWM modulator, a drive signal for the power converter based on the corrected carrier frequency and the torque command which has the torque value subjected to the second clipping; and
    supplying, by the PWM modulator, the drive signal to the power converter to drive the motor.

* * * * *